UNITED STATES PATENT OFFICE.

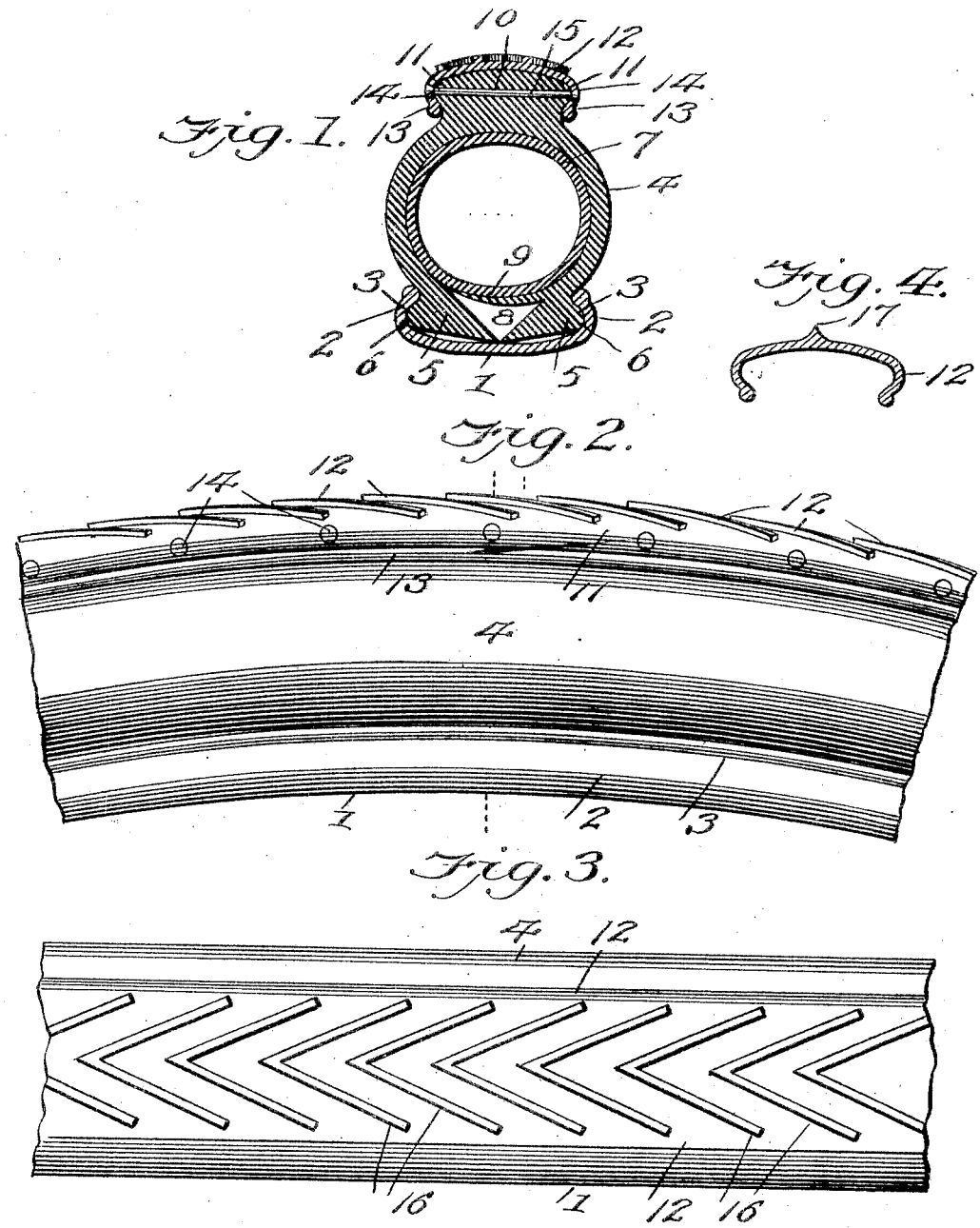

JACKSON O. HAAS, OF POTTSVILLE, PENNSYLVANIA.

PNEUMATIC TIRE.

No. 797,200.　　　　Specification of Letters Patent.　　　　Patented Aug. 15, 1905.

Application filed August 1, 1903. Serial No. 167,914.

*To all whom it may concern:*

Be it known that I, JACKSON O. HAAS, a citizen of the United States, residing at Pottsville, in the county of Schuylkill and State of Pennsylvania, have invented new and useful Improvements in Pneumatic Tires, of which the following is a specification.

My invention relates to pneumatic tires; and its primary object is to provide a new and useful device of this character which is rendered puncture-proof without sacrificing any of the essential characteristics of a pneumatic tire—namely, durability, speed, resiliency, and efficiency.

A further object of the invention is to provide a novel shield for rendering the tire puncture-proof and adapting it to secure a firm grip upon the surface over which the wheel is moving to obviate all liability of accidents or the loss of speed accruing from the slipping of the tire.

A still further object of the invention is to provide a tire which is so constructed that the pressure exerted by the compressed air within the tire, which tends to render the tire circular, exerts its greatest force against the rim and tread to secure the tire in applied position upon the wheel-rim and to secure the shield in applied position upon the tire.

The invention consists of the construction, combination, and arrangement of parts hereinafter described, claimed, and illustrated in the accompanying drawings, in which—

Figure 1 is a transverse sectional view of a tire constructed in accordance with my invention. Fig. 2 is a side elevation of a fragmentary portion thereof. Fig. 3 is a top plan view of a similar portion of the tire. Fig. 4 is a detail sectional view of a modified form of the shield.

Referring to the drawings by reference-numerals, 1 designates a wheel-rim having its longitudinal edges provided with slightly-curved flanges 2 to provide channels 3.

4 designates the outer casing of a pneumatic tire, the under side of which is slitted to provide depending wings 5, having their outer longitudinal edges provided with shoulders 6, adapted to fit in the channels 3 in the rim to be forcibly retained therein by the inflation of the inner tube 7. The inner surface of the casing is elliptical in cross-section, the longitudinal axis of the ellipse extending transversely of the wheel-rim. The inner edges of the wings 5 are adapted to lie in engagement when the tire is in applied position, thereby leaving a triangularly-shaped space 8, as clearly illustrated in Fig. 1 of the drawings. Lying across the space 8 to provide the outer casing with a continuous inner surface is a tongue 9, preferably formed integral with said casing.

The tread of the outer tube is provided with an annular rib 10, having the outer surface thereof slightly convexed and its longitudinal edges grooved to provide shoulders 11. This rib is provided with a continuous shield 12, which is slightly curved in cross-section and constructed from metal or any non-penetratable material to render the tire puncture-proof, said shield having a diameter slightly smaller than that of the tire if the same were inflated without being confined within said shield. The shield is provided with depending flanges 13, curved in reverse directions to provide channels 14, adapted to receive the shoulders 11 of the rib 10. In order to permit the tire to secure a firm grip upon the surface over which it moves and to prevent slipping and overcome the attractive resistance between the tire and said surface, I provide the periphery of the shield with V-shaped ribs 16, which will accomplish the desired results in a manner that is obvious.

The provision of the shield with V-shaped ribs, as above set forth, especially adapts a tire for application to the rear or drive wheels of a vehicle, while the shields of the tires of the front wheels of a vehicle are provided with an annular rib 17, as clearly illustrated in Fig. 4 of the drawings. This rib 17 prevents the wheels from slipping and presents to the surface over which the vehicle is moving a small portion of the tire to diminish the amount of friction to a minimum.

It is well known that in inflating a tire the tendency is to assume a circular form in cross-section unless restrained either at the rim or by some means upon the tread. In view of the fact that the shield 12 is smaller diametrically than the outside of the tire would be were it inflated without restraint the tire will remain elliptical, and the pressure which, exerted by the compressed air within the tire, tends to render the tire circular has its greatest force exerted against the rim and the tread to secure the tire in applied position upon the wheel-rim and to secure the shield in position upon the tire.

By making the tire elliptical, as shown, another advantageous result is obtained—namely, that when the lower portion of the tire is compressed incident to the weight thereon the top portion of the tire will be permitted to expand to compensate for the compression at the bottom portion of the tire. If it is desired, pins 15 may be passed through the flanges 13 and rib 10 to bind the lower edges of the flanges under the shoulders 11, as clearly illustrated in Fig. 1 of the drawings.

It is apparent from the above description, taken in connection with the accompanying drawings, that I provide tires which are non-puncturable and which enable the drive-wheels of a vehicle to secure a firm grip upon the surface over which the vehicle is moving and which causes the vehicle to follow the direction of the steering-wheels, as the rib 17 thereon will not permit said wheels to slip, and also that all accidents resulting from the slipping of the wheels are obviated.

Having thus described the invention, what is claimed as new is—

1. The combination with a wheel-rim, of an inflatable tire elliptical in cross-section, and a shield adapted to fit upon the tire and of a diameter smaller than that of the tire when the latter is inflated, whereby the pressure which is exerted to render the tire circular is confined and exerted against the wheel-rim and shield to expand the tire into the shield and thereby secure the tire and shield in applied position.

2. The combination with a wheel-rim, of an inflatable tire elliptical in cross-section and provided with a tread having lateral undercut shoulders, and a shield adapted to rest against the tread and provided with inturned or hooked flanges to engage said shoulders, said shield having a diameter slightly less than the diameter of the tire when inflated, whereby the pressure of the inflating medium which is exerted to render the tire circular will be confined and exerted against the wheel-rim and shield to force the tread in applied position within the shield and maintain the tread-shoulders in engagement with the inturned or hooked flanges of the shield, substantially as described.

3. The combination with a wheel-rim, of an inflatable tire elliptical in cross-section and provided with a tread having lateral undercut shoulders, a shield adapted to rest against the tread and provided with inturned or hooked flanges to engage said shoulders, said shield having a diameter slightly less than the diameter of the tire when inflated, whereby the pressure of the inflating medium which is exerted to render the tire circular will be confined and exerted against the wheel-rim and shield to force the tread in applied position within the shield and maintain the tread-shoulders in engagement with the inturned or hooked flanges of the shield, and mechanical means for additionally retaining said shoulders in engagement with said flanges, substantially as described.

4. The combination with a wheel-rim, of an inflatable tire elliptical in cross-section and provided with a tread having lateral undercut shoulders, a shield adapted to rest against the tread and provided with inturned or hooked flanges to engage said shoulders, said shield having a diameter slightly less than the diameter of the tire when inflated, whereby the pressure of the inflating medium which is exerted to render the tire circular will be confined and exerted against the wheel-rim and shield to force the tread in applied position within the shield and maintain the tread-shoulders in engagement with the inturned or hooked flanges of the shield, and fastening devices passing transversely through the tread, shoulders and flanges and forming auxiliary means for preventing forcible disengagement of the flanges from the shoulders, substantially as described.

5. The combination with a wheel-rim having channels, of a casing elliptical in cross-section and provided with wings having shoulders to engage said channels, said wings being formed with inner contacting edges, and divergent faces forming an inwardly-converging space, an inflatable tube within the casing, said casing being adapted to expand to a circular form under the distension of the tube when the latter is inflated, and a tongue attached at one edge to one side of the casing adjacent to the inclined face of the contiguous wing and projecting over to the opposing wing and crossing and covering the said space, said tongue being free at its opposite edge to have limited movement in said space to accommodate itself to the change in form of the tire and guided in such movement at its free edge by the inclined face of the adjacent wing, substantially as described.

In testimony whereof I affix my signature in presence of two witnesses.

JACKSON O. HAAS.

Witnesses:
E. P. LEUSCHNER,
FRANK TAYLOR.